Patented Mar. 28, 1939

2,151,946

UNITED STATES PATENT OFFICE 2,151,946

CAST PHENOLIC RESINS

James E. Symonds, Mount Vernon, N. Y.

No Drawing. Application July 31, 1936,
Serial No. 93,616

6 Claims. (Cl. 260—57)

This invention relates to improvements in cast phenolic resins and includes improvements in methods of producing such resins and the new resin products so produced. More particularly the invention relates to the production of cast phenolic resins which possess marked toughness and mechanical strength, which can be easily machined, which take a high polish, and which will stand repeated heating by plunging into hot water and then chilling in colder water. The phenol resin products are insoluble and infusible, and, depending upon the process employed in producing them, may be opalescent or translucent, or may be opaque. The process of the present invention, in its various embodiments and with its various modifications, enables such different products to be produced at will.

The process of the present invention, moreover, enables such improved cast phenolic resins to be produced without the intermediate production of a gel or without first going through the "gel" stage during their production.

According to the present invention there is first prepared a liquid condensation product from phenol or its homologues and from anhydrous aldehydes such as trioxymethylene with the use of from about 2 to 3 or more methylene or ethylene groups for each phenol group; and the condensation product is prepared either in the presence or absence of a basic catalyst, or in the presence of an insoluble catalyst which does not enter into combination with the resin. This liquid condensation product is subsequently treated, by one or another method of further treatment which includes first the use of a suitable organic acid and subsequently the use of a suitable mineral acid or of another suitable organic acid, depending somewhat upon the character of the final product desired.

The invention will be further illustrated by the following more detailed description, but it will be understood that the invention is not limited thereto.

As an example of the process, 100 parts by weight of phenol are melted in a suitable kettle which is provided with a jacket, a stirring device, and a connection to a vacuum pump, and, to the melted phenol there is added about 60 parts by weight of trioxymethylene and the temperature is raised to about 53° C., while stirring vigorously, until the mixture becomes a uniform, creamy liquid, free from any sizable lumps.

To this creamy liquid there is then added from 0.1 to 0.16 part by weight of caustic soda dissolved in the smallest possible quantity of water. The temperature will rise owing to the exothermic reaction that takes place. At this same time the heat is shut off and the cold water is turned into the jacket of the kettle so that the temperature is maintained preferably at about 65° C. but not above 72° C., when the whitish appearance of the mixture in the kettle changes to yellow. A further and similar amount of caustic soda is added in like manner and with constant agitation and the temperature is held below 72° C. and preferably at about 65° C. for example about one hour, when a further and similar addition of caustic soda is made, making the total amount of caustic soda about 0.3 to 0.5 part by weight. The reaction is continued under atmospheric pressure and with maintenance of the temperature at about 75° C. for a period e. g. of about three hours at which time the liquid will be quite clear and the exothermic reaction will have subsided somewhat. At no time is there a separation of the mass into layers.

The heating or reaction is then continued under reduced pressure, by the application of a vacuum to the kettle, and while holding the temperature at around 70 to 75° C. for a period e. g. of about five hours until the liquid product is free or practically free from water. The product made in this way is quite fluid so that under the reduced pressure the water present in the liquid condensation product can readily escape so as to leave an anhydrous, liquid condensation product.

To the liquid, anhydrous condensation product thus produced there is added a sufficient amount of a suitable organic acid to neutralize the caustic soda and to give an excess of about 1% of acid on the condensation product. As suitable organic acids may be mentioned acetic, formic and lactic acids, with acetic as the preferred and in general more advantageous acid. The heating or control of temperature is continued under reduced pressure while maintaining a temperature around 75° C. for a further period e. g. of three hours. There is then added from 10 to 20%, based upon the condensation product, of glycerin which has been freed from water by heating it at 100° C. and under a reduced pressure until it is quite anhydrous.

In order to produce the final hardened products with a faint opalescence or with a range varying from faint opalescence to dense opacity, there is added to the initial liquid condensation product, after the treatment with the organic acid and the admixture of glycerin above described, a small amount of a suitable organic or mineral acid, particularly hydrochloric acid. The amount of mineral acid added depends upon the degree of opacity desired in the final product. For example, if a dense opaque final product is required, about 3.0% of hydrochloric acid of specific gravity 1.19 may be added. If a final product of a less dense opacity is desired the amount of hydrochloric acid may be around 2%; and the amount can be further reduced to obtain less opaque products down to e. g. around 0.3% where a faintly opalescent final product is to be obtained.

The addition of the hydrochloric acid results in the formation or precipitation, to a greater or less degree, depending upon the amount of acid used, of molecules or aggregates which give more or less opacity to the product before, as well as after, the resin is finally hardened by heat. These opaque molecules or aggregates are infused through the resin and confer upon it opacity, translucence or opalescence depending upon the amount of acid used and the amount of such opacity-producing molecules or aggregates present.

That the water introduced with the hydrochloric acid does not play any part in causing the opacity is indicated by the fact that the same amount of water added to a transparent resin, to which hydrochloric acid is not added and hardened by heat in an oven, yields a transparent resin as the final resin product.

When the hydrochloric acid is added, the precipitation takes place while the resin is still liquid, and opacity is imparted to the product. Upon curing in the oven the resin becomes more and more viscous, going through a stiff, pasty stage and finally becoming hard.

When resins treated with hydrochloric acid are molded and hardened, they are placed in the mold while in a liquid condition, after the hydrochloric acid addition, and they are then placed in the curing oven, gradually heated to around 90° C. and kept there until the desired hardness is obtained, when the molds are removed and allowed to cool and the hardened resin removed therefrom.

According to another method of procedure, instead of adding a mineral acid, such as hydrochloric acid, to cause precipitation of opaque condensation products in the liquid mass, certain organic acids can be similarly used, more particularly alcoholic solutions of oxalic acid. With oxalic acid the amounts required range from 2% for the production of an opaque final product down to around 0.05% for the production of a faintly opalescent final product.

Variations can be made in the process to produce somewhat different properties in the product. For example, suitable dyes can be added to the liquid condensation product to give any desired tint or color to the final product. If pure white or pastel shades are required, the phenols should be of suitable purity and the methylene groups are advantageously increased up to 3 methylene groups to 1 phenol group, instead of using about 2 methylene groups for each phenol group. Where the phenol is impure or has a distinct color, this influences the color of the final product.

While trioxymethylene is referred to in the preceding specific illustration of the process, other anhydrous polymers of aldehydes can be used such as paraldehyde or metaldehyde, sufficient of the polymerized aldehyde being employed to give a hard final product without materially changing the desirable mechanical qualities of the product.

The following detailed example will illustrate a similar but modified procedure for producing the new products:

To about 100 parts of phenol or its homologues there is added about 60 parts of trioxymethylene to give about 2 methylene groups to each phenol group. This mixture is heated in a kettle with constant agitation at about 53° C. and maintained at about this temperature until the whole mixture becomes a creamy liquid, free from any sizable lumps. There is then added, three successive portions of caustic soda of 0.1 to 0.16 part each, making a total of about 0.3 to 0.5 part. The mixture is then maintained at atmospheric pressure and at a temperature around 72° C., for e. g. about six hours. The greater part of the water formed by the reaction is allowed to escape as vapor.

To the liquid condensation product thus produced there is then added a sufficient amount of a suitable organic acid, such as acetic acid, to neutralize the soda and to give about 5% excess of acid, based upon the resin. Heating is continued for a short time at about 65° C. and with agitation until the mixture is uniform. There is then added about 20 parts of glycerin and the mixture is further agitated until uniform. At this point a portion of the water that is split off by the reaction can be removed by reducing the pressure if desired.

With some grades of raw materials the color of the liquid condensation product at this stage of the process is of a clear amethyst tint, and when there is then added cautiously and gradually a dilute mineral acid, advantageously hydrochloric acid, this amethyst tint is discharged and the color becomes a faint blue. The amount of acid thus added can be varied and may be as little as .03% or less or in some cases up to around 3%.

After the hydrochloric acid has been added and admixed the mixture is heated without agitation until free from air bells at a temperature of about 60° C. and the liquid condensation product is then poured or cast into heated molds.

The molds containing the resin are then placed in a curing oven heated at first to about 62° C. for about one hour. Further reaction will take place and there will be precipitated in the liquid a dense, opaque resin without going through any "gel" stage, the liquid first becoming pasty and finally becoming hard. The temperature in the oven is increased to around 65–68° C. for a sufficient time, e. g. about 10 hours, with the resulting production of a resin which is quite hard and infusible and of an ivory white appearance.

The degree of toughness of the product can be modified by reducing or increasing the amount of glycerin. Also other materials may be admixed in making the resins such as for example triphenyl-phosphate or tricresyl-phosphate as a plasticizer, or there can be added fillers, pigments, starch, glue, etc., to modify the final product. Suitable dyes can also be added to give any desired tint, as previously described. So also, if pastel shades or pure white products are desired, the proportion of methylene groups to each phenol group should be increased, and the purity of the phenol should be considered.

In carrying out the process, the initial condensation, which results in the production of a thinly liquid condensation product, is followed by a further reaction in which a small amount of an organic acid is used. This initial product may be anhydrous, as in the first example, or may contain a small amount of water, as in the second example. The later stages of the process are carried out with the addition of a mineral acid such as hydrochloric acid or with the addition of a suitable organic acid which will bring about the production of the opaque reaction products in the still liquid condensation product which is subsequently converted into the final insoluble and infusible condensation product, which final proudct may be an opaque product or a product of varying degree of opalescence.

In the specific examples I have not included mention or reference to the addition and admixture of opaque pigments or fillers, or of starch, glue, casein, etc., to modify the final product, but such are not excluded. Where such pigments or fillers are used the product will be opaque even though the resin itself may be opalescent. Where products are desired with a regulated opalescence or translucence, opaque pigments or fillers which will interfere or prevent the desired opalescence or translucence should not be used.

The present invention provides an improved method of making valuable cast phenolic resins and molded resinous products which present advantages in their properties, such as those hereinbefore pointed out. The entire process can be carried out in a period of 24 hours or less, although a longer time is not precluded.

In the process of the first example, the initial liquid product is anhydrous and the final product may be practically anhydrous or may contain a small amount of water. In the second example, where all of the water may not be removed, the liquid product may not be anhydrous, and the final product may or may not be anhydrous but usually will contain water in small amount. It is one advantage of the present process that it is not necessary to remove water from the product in order to obtain a satisfactory product, although the water can be removed to a greater or less extent, when desired. The final products, although produced with the use of acids, are neutral in character.

I claim:

1. The method of making cast phenolic resins which comprises preparing a liquid substantially anhydrous condensation product by the reaction of a substantially anhydrous mixture of a phenol and a polymeric formaldehyde in the proportions of about two to three methylene groups for each phenol group, said condensation product being prepared by a method which includes the step of heating the same at reduced pressure until the condensation product is substantially anhydrous, adding to said liquid substantially anhydrous condensation product a small percentage of an organic acid sufficient in amount to render the product slightly but distinctly acidic, heating the resulting acidic product for about three hours under reduced pressure at about 75° C. to effect further condensation and form an acid condensation product which is liquid and substantially anhydrous, admixing anhydrous glycerin with the resulting acid condensation product, thereafter adding a further small amount of acid to impart opalescence or opacity to the product, introducing such product into molds, and curing the same by prolonged heating.

2. The method of making cast phenolic resins which comprises forming a substantially anhydrous mixture of a phenol and a polymeric formaldehyde in the proportions of about two to three methylene groups for each phenol group, adding successive portions of caustic soda to the phenol-aldehyde mixture at a temperature below about 72° C. until a total of about 0.3 to 0.5% caustic soda on the weight of the phenol has been added, heating said mixture after the addition of all the caustic soda for about three hours at about 75° C. to form an initial condensation product, thereafter heating the mixture under reduced pressure at a temperature of about 70 to 75° C. for about five hours to obtain a substantially anhydrous liquid condensation product, adding to said product a small percentage of organic acid sufficient in amount to neutralize the caustic soda and give an excess of about 1% acid on the weight of the product, heating the resulting acidic product for about three hours under reduced pressure at about 75° C. to effect further condensation and form an acid condensation product which is liquid and substantially anhydrous, admixing anhydrous glycerin with the resulting acid condensation product, thereafter adding a further small amount of acid to impart opalescence or opacity to the product, introducing such product into molds, and curing the same by prolonged heating.

3. The method of making cast phenolic resins which comprises forming a substantially anhydrous mixture of phenol and trioxymethylene in the proportion of about 2 to 3 methylene groups for each phenol group, adding successive portions of caustic soda to the phenol-trioxymethylene mixture at a temperature below about 72° C. until a total of about 0.3 to 0.5% caustic soda on the weight of the phenol has been added, heating said mixture after the addition of all the caustic soda for about three hours at about 75° C. to form an initial condensation product, thereafter heating the mixture under reduced pressure at a temperature of about 70 to 75° C. for about five hours to obtain a substantially anhydrous liquid condensation product, adding to said product a small percentage of organic acid sufficient in amount to neutralize the caustic soda and give an excess of about 1% acid on the weight of the product, heating the resulting acidic product for about three hours under reduced pressure at about 75° C. to effect further condensation and form an acid condensation product which is liquid and substantially anhydrous, adding from 10 to 20% of anhydrous glycerin based on the weight of the condensation product, thereafter adding a further small amount of acid to impart opalescence or opacity to the product, introducing such product into molds, and curing the same by prolonged heating.

4. The method of making cast phenolic resins which comprises forming a substantially anhydrous mixture of phenol and trioxymethylene in the proportion of about two to three methylene groups for each phenol group, adding successive portions of caustic soda to the phenol-trioxymethylene mixture at a temperature below about 72° C. until a total of about 0.3 to 0.5% caustic soda on the weight of the phenol has been added, heating said mixture after the addition of all the caustic soda for about three hours at about 75° C. to form an initial condensation product, thereafter heating the mixture under reduced pressure at a temperature of about 70 to 75° C. for about five hours to obtain a substantially anhydrous liquid condensation product, adding to said product a small percentage of organic acid sufficient in amount to neutralize the caustic soda and give an excess of about 1% acid on the weight of the product, heating the resulting acidic product for about three hours under reduced pressure at about 75° C. to effect further condensation and form an acid condensation product which is liquid and substantially anhydrous, adding from 10 to 20% of anhydrous glycerin based on the weight of the condensation product, thereafter adding from about 0.03 to 3% of hydrochloric acid (sp. gr. 1.19) on the weight of the product to impart opalescence or opacity to the product, introducing such product into molds, and curing the same by prolonged heating.

5. Cast phenolic resins produced in accordance with the process of claim 1.

6. Cast phenolic resins produced in accordance with the process of claim 2.

JAMES E. SYMONDS.